US006617576B1

(12) United States Patent
Voss et al.

(10) Patent No.: US 6,617,576 B1
(45) Date of Patent: Sep. 9, 2003

(54) CYCLOIDAL MASS SPECTROMETER WITH TIME OF FLIGHT CHARACTERISTICS AND ASSOCIATED METHOD

(75) Inventors: Guenter F. Voss, Much (DE); Alan B. Celo, Indianola, PA (US); Anthony N. Duryea, Cheswick, PA (US)

(73) Assignee: Monitor Instruments Company, LLC, Cheswick, PA (US)

( * ) Notice: Subject to any disclaimer, the term of this patent is extended or adjusted under 35 U.S.C. 154(b) by 0 days.

(21) Appl. No.: 10/085,542

(22) Filed: Feb. 28, 2002

Related U.S. Application Data

(60) Provisional application No. 60/273,062, filed on Mar. 2, 2001.

(51) Int. Cl.[7] .......................... B01D 59/44; H01J 49/00; H01J 49/30

(52) U.S. Cl. ....................... 250/290; 250/281; 250/282; 250/283; 250/284; 250/287; 250/291; 250/293; 250/298

(58) Field of Search ................................ 250/281, 282, 250/283, 284, 287, 290, 291, 293, 298

(56) References Cited

U.S. PATENT DOCUMENTS

| | | | | | |
|---|---|---|---|---|---|
| 2,882,410 | A | | 4/1959 | Brobeck | |
| 3,070,951 | A | | 1/1963 | Hetzel | |
| 3,590,243 | A | | 6/1971 | Perrin et al. | |
| 3,644,775 | A | * | 2/1972 | Damoth et al. | 313/237 |
| 3,742,212 | A | * | 6/1973 | McIver, Jr. | 250/286 |
| 3,937,955 | A | * | 2/1976 | Comisarow et al. | 250/283 |
| 4,298,795 | A | | 11/1981 | Takeuchi et al. | |
| 4,535,235 | A | * | 8/1985 | McIver, Jr. | 250/282 |
| 4,649,279 | A | * | 3/1987 | Delmore | 250/427 |
| 4,882,485 | A | | 11/1989 | Duryea | |
| 4,952,802 | A | | 8/1990 | Duryea | |
| 4,959,543 | A | * | 9/1990 | McIver et al. | 250/291 |
| 5,155,357 | A | * | 10/1992 | Hemond | 250/291 |
| 5,304,799 | A | | 4/1994 | Kurzweg | |
| 5,463,226 | A | * | 10/1995 | Matsuzaki et al. | 250/374 |
| 6,355,929 | B1 | * | 3/2002 | Littlejohn et al. | 250/288 |

* cited by examiner

*Primary Examiner*—John R. Lee
*Assistant Examiner*—Mary El-Shammaa
(74) *Attorney, Agent, or Firm*—Arnold S. Silverman; Eckert Seamans Cherin & Mellott, LLC

(57) ABSTRACT

A method of separating ions according to mass in a mass spectrometer includes establishing a stream of ions traveling in a generally cycloidal path in an electric field and a magnetic field, subsequently causing the electric field to terminate for a predetermined period of time while maintaining the magnetic field thereby causing the electrons to travel in a generally circular path for a predetermined time period and subsequently reestablishing the electric field to cause further travel in a cycloidal path and providing a detector for receipt of some of the ions. A suitably programmed microprocessor is employed to control operation of the mass spectrometer and to receive electrical signals responsive to ions impacting on the detector to thereby provide information regarding the ions. Corresponding apparatus is provided.

17 Claims, 6 Drawing Sheets

CYCLOIDAL MASS SPECTROMETER WITH TIME OF FLIGHT CHARACTERISTICS AND ASSOCIATED METHOD

CROSS-REFERENCE TO RELATED APPLICATION

This application claims the benefit of U.S. Provisional Application Ser. No. 60/273,062, entitled "CYCLOIDAL MASS SPECTROMETER WITH TIME OF FLIGHT CHARACTERISTICS AND ASSOCIATED METHOD," filed Mar. 2, 2001.

BACKGROUND OF THE INVENTION

1. Field of the Invention

The present invention relates to an improved cycloidal mass spectrometer which employs modified time of flight characteristics so as to provide a smaller and more efficient high-resolution magnetic mass spectrometer.

2. Description of the Prior Art

The use of mass spectrometers in determining the identity and quantity of constituent materials in a gaseous, liquid or solid specimen has long been known. It has been known, in connection with such systems, to analyze the specimen under vacuum through conversion of the molecules into an ionic form, separating the ions by their mass to charge ratio, and permitting the ions to bombard a detector. See generally U.S. Pat. Nos. 2,882,410; 3,070,951; 3,590,243; and 4,298,795. See also U.S. Pat. Nos. 4,882,485 and 4,952,802.

In general, ionizers contain an ionizer inlet assembly wherein the specimen to be analyzed is received, a high vacuum chamber which cooperates with the ionizer inlet assembly. An analyzer assembly is disposed within the high vacuum chamber and is adapted to receive ions from the ionizer. Detector means are employed in making a determination regarding the constituent components of the specimen employing mass to charge ratio as a distinguishing characteristic. By one of many known means, the molecules of a gaseous specimen contained in the ionizer may be converted into ions which are analyzed by such equipment.

It has been known with prior art cycloidal mass spectrometers to use a single collector and ramped electric field in looking at only one mass to charge ratio at a time.

In known mass spectrometer systems, whether of the cycloidal variety or not, the analyzers are quite large and, as a result, dominate the design and specifications of the systems to be employed therewith.

U.S. Pat. No. 5, 304,799 discloses an improved cycloidal mass spectrometer of reduced dimension. The disclosure of this patent is expressly incorporated herein by reference.

Time of flight magnetic mass spectrometers typically involve acceleration of ions and identification based upon the time that it takes the ions to arrive at the detector. To operate efficiently and achieve the desired resolution at higher molecular masses, the flight paths must be very long and, as a result, in respect of higher molecular masses, it is difficult to achieve the desired resolution and the equipment can be expensive. One of the challenges in such a system is the need to maintain a uniform magnetic field throughout the entire path of ion flight.

Position resolving mass spectrometers employ the effect that ions of different molecular weight move in different flight paths and make determinations based upon the portion of the detector impacted by the ions.

There remains, therefore, a very real and substantial need for an improved magnetic mass spectrometer and an associated method which can employ general principles of time of flight spectrometers and cycloidal mass spectrometers while achieving enhanced resolution in an instrument which is of relatively small size.

SUMMARY OF THE INVENTION

The present invention has met the above-described needs.

The method of separating ions according to mass employing mass spectrometry includes establishing in phase 1 a stream of ions traveling in a generally cycloidal path in an electric field and a magnetic field. The electric field is caused in phase 2 of the method to terminate while maintaining the magnetic field, thereby causing the ions to travel in a circular path within the magnetic field for a predetermined number of times, after which the electrical field is reestablished, thereby causing the ions to travel in a further cycloidal path (phase 3) and thereby to effect movement either into or not into an associated detector. Appropriate microprocessor means receives output from the detector responsive to impingement of ions thereon.

The method, therefore, combines concepts of cycloidal mass spectrometry with a much improved time of flight concept wherein circular motion within a limited region of a uniform magnetic field is employed.

The corresponding apparatus provides a cycloidal ionizer for converting a specimen into a plurality of ion beams which travel in a generally cycloidal path within a magnetic field and an electric field. A microprocessor in phase 2 terminates the cycloidal travel and converts it to generally circular ion travel by terminating the electric field for a predetermined period of time after which the electric field is reinitiated to cause further travel in a generally cycloidal path.

It is an object of the present invention to provide a mass spectrometer which employs concepts of time of flight spectrometers and cycloidal mass spectrometers in effecting improved resolution and an associated method.

It is a further object of the present invention to provide a reduced size mass spectrometer of the foregoing type which provides improved resolution and is economically advantageous.

It is a further object of the present invention to employ such a system which requires only a relatively small magnetic field, thereby enhancing performance and reducing the cost of employing the system.

It is a further object of the present invention to provide such a system which permits automated rapid analysis of ions based upon mass to charge ratios.

These and other objects of the invention will be more fully understood from the following detailed description of the invention on reference to the illustrations appended hereto.

DESCRIPTION OF THE PREFERRED EMBODIMENTS

While the actual path of movements of ions through portions of the mass spectrometer as disclosed herein might correctly be described a "trochoid", it has been accepted in the art to refer to such a mass spectrometer as a "cycloidal mass spectrometer" and this term will be employed herein with reference to the analyzer and which, but for the use of the switching of the electrical field of the present invention, would be a normal path of movement of the ions through the analyzer.

Figure 1:
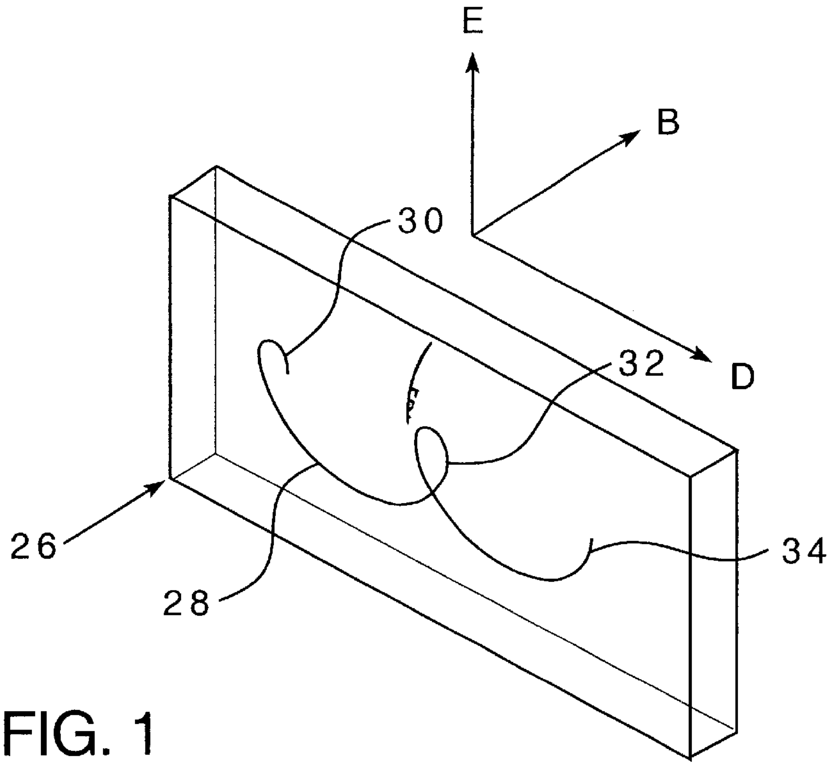
FIG. 1 illustrates schematically movement of an ion along a cycloidal or trochoidal path responsive to electrical and magnetic fields.

FIG. 1 is a schematic illustration of a mass spectrometer housing 26 within which is a cycloidal mass spectrometer housing known in the art within which an ion moving in a direction indicated generally by the arrow D. The ion in its path of travel is influenced by the electric field E and magnetic field B. It moves in a cycloidal or trochoidal path 28 from the point from which it emerges from the ionizer 30 through loop 32 to the distal end 34. The spatial length is a function of the mass-to-charge ratio of the ion.

Figure 2:
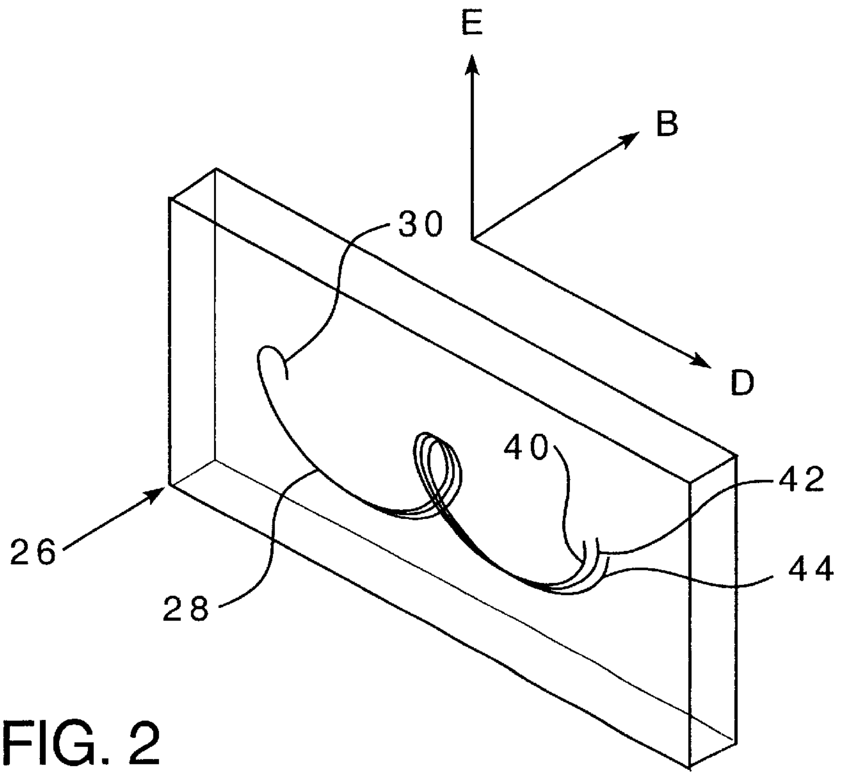
FIG. 2 illustrates the trajectory path of three ions of different molecular weight under the influence of electrical and magnetic fields.

Referring to FIG. 2, there is shown a similar cycloidal mass spectrometer wherein three charged ion particles emerge from the ionizer at 30 and, as a result of having different molecular weights, have three different trajectories, as shown generally by paths 40, 42 and 44. In order to achieve the desired spatial resolution in such known systems, the flight paths must be of sufficient length to accomplish this objective and, therefore, the spectrometers must be of large size.

The present invention has an object of keeping the dimensions of the mass spectrometer relatively small. For example, the exterior of the housing which may be made of any suitable material, such as stainless steel, for example, may be on the order of about 3 inches in length, ¾ inch in depth, and 2 inches in height. It may have a generally rectangular cross-sectional shape such as that identified in FIGS. 1 and 2 by the reference numeral 26.

The present invention has accomplished these objectives by combining a specific cycle of operation with the desired time resolving and spatial separation capabilities of the cycloidal mass spectrometer.

Figure 3:
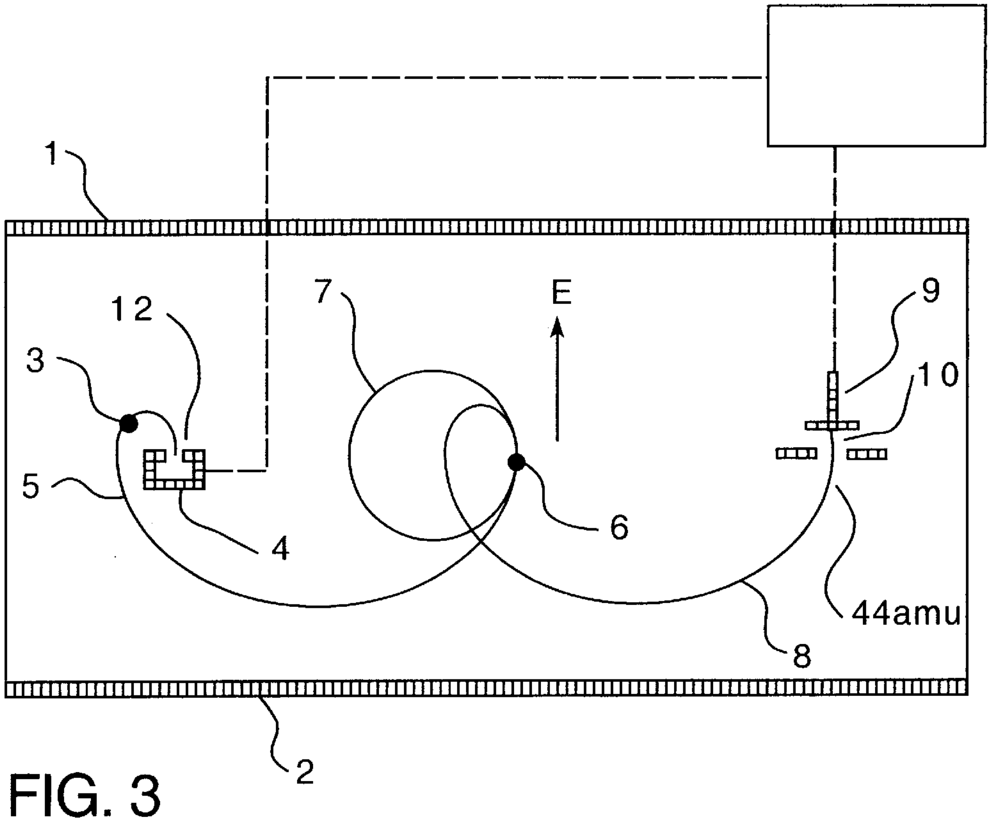
FIG. 3 is a schematic view of a path of movement of an ion in accordance with the apparatus and method of the present invention.

In the form shown in FIG. 3, a pair of relatively spaced generally parallel electrodes 1 and 2 create an electric field E as shown by the arrow. The ionizer 4 has an outlet 12 out of which ions identified generally by the number 3 emerge and pass through phases 5, 6, and 8 in a manner to be described herein. This results in three phases of movement with an intermediate phase involvement ion flight in a circle 7 followed by passage of the ion through opening 10 for impingement on detector 9. The detector will have a responsive electrical output which is delivered to a microprocessor 51 suitably programmed in a manner known to those skilled in the art. The microprocessor 51 also controls operation of the ionizer 4. The ions 3, shown in FIG. 3, is assumed for purposes of example to have a molecular weight of 44 amu.

In the preferred form, as shown in FIG. 3, the process involves three phases. In the first phase, ions 3 will emerge from the ionizer 4 through opening 12 and will travel in a cycloidal path 5 which, at phase 2, results in the electrical field being turned off, thereby causing the ions to travel in a path which becomes circle 7. This achieves the desired distance of travel without requiring the use of prior art elongated analyzers to permit linear travel of comparable distance. In phase 3, the electrical field is turned on and the ions continue to fly in a cycloidal path 8 to enter the detector 9 through opening 10. For convenience of reference herein point 6 will be regarded as the point where phase 1 ends, phase 2 begins and ends and phase 3 begins.

It is seen in FIG. 3 that the ions 3 emerging from ionizer 4 through opening 12 initially travel in a cycloidal path 5 within the electrical and magnetic fields. When the ions from the phase 1 injection portion of the process reach the time of flight portion, the electrical field is turned off with the ions cycloidal trajectories under the influence of the magnetic field converted to circular trajectories 7 with the so-called cyclotron frequency. It will be noted that, in the form shown, the ion path 5 begins in the circle at point 6 and emerges at point 6 to move in path 8. The cyclotron frequency depends upon the strength of the magnetic field B and the mass-to-charge ratio of ion 3. The diameter of the circles 7 depends on the last velocity of the ion when the electrical field is switched off.

Different ions would, therefore, flow at different angles at the end of phase 2 and would assume non-equivalent positions of the corresponding circles at the end of phase 2 which creates the angular separation. It will be appreciated that the total time of flight can be selected to precisely produce a desired separation.

In phase 3, the electrical field is switched on again and the ions continue moving along the cycloidal path 8. The point 54 where the cycloidal path is initiated again depends upon the ion's parameters of motion at the end of phase 2, the last position, the last velocity, and the last angle of the ion's motion determine the continuation of the flight. As will be apparent, in phase 3, only ions matching certain conditions will arrive at and impinge upon connector 9 while other ions will miss it or be diverted along the way.

It will be appreciated, therefore, that qualitatively the cycloidal mass spectrometer of the present invention provides additional filter characteristics if the trajectories of flight flow through the three described phases. As will be apparent, there are potentially an infinite number of combinations of the switching time periods for a variety of mass filter functions. If the analyzer is designed with respect to the length of full trochoids and the switching times are multiples of the inverse of one atomic mass unit, FIGS. 3 and 4 show trajectories of ions inside an analyzer which allows two cycloidal paths of flight before the ions impinge the detector 9.

Figure 4:
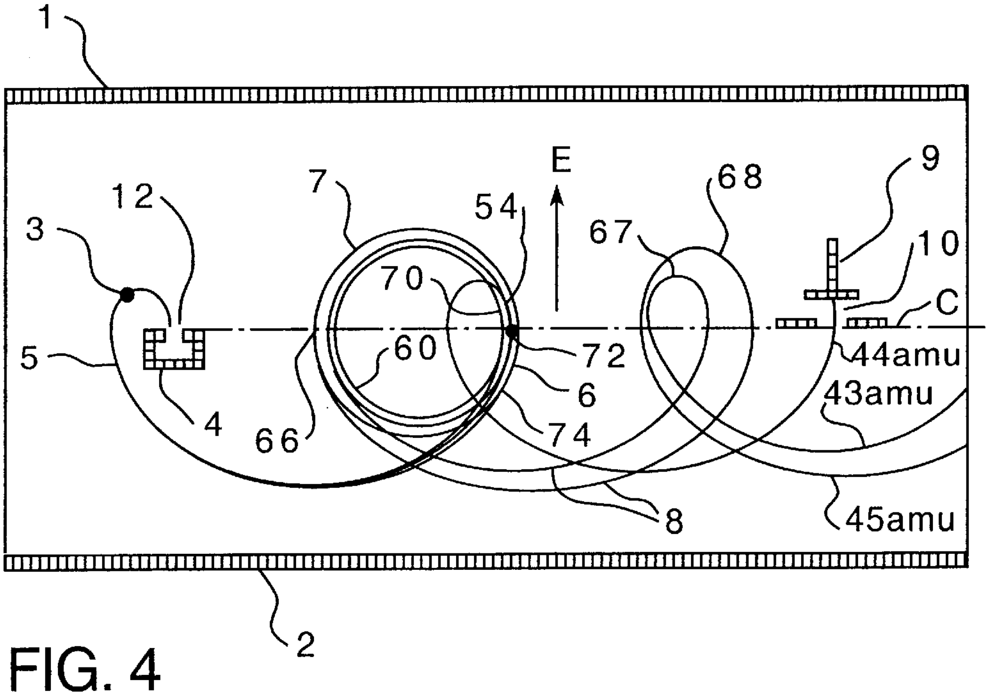
FIG. 4 is a schematic illustration of a system of the present invention showing examples of the path of movement of three ions through the analyzer.

As shown in FIG. 4 that the 43 amu and 45 amu paths of flight miss the detector 9 completely. It is also noted that the 43 amu ion departs from the circle at point 60 while the 44 amu departs from the circle at point 54 and the 45 amu ion departs from the circle at point 66. It is also noted that the 43 amu and 45 amu have, respectively, additional loops 67, 68 in their paths of travel.

It will be appreciated that the analyzer employed in FIGS. 3 and 4 will become a filter for ions with a mass to charge ratio of 44. The analyzer is able to separate adjacent or neighboring mass peaks, such as 43 amu and 45 amu at merely arbitrary high positions by increasing the number of revolutions in the circular path 7 during the time of flight second phase. The invention also provides the tremendous advantage compared to prior art systems of not requiring long time of flight patterns throughout the extent of which uniform magnetic fields must be provided on an ongoing basis, but rather permits the magnetic field to be concentrated on the phase 2 region wherein the path of flight is generally circular. This is a relatively small area. It further eliminates the need to have precise determination of long distances on the linear type time of flight spectrometers.

In general, it will be preferred that the phase 2 period during which the electrical field is off will last about 100 to 150 nanoseconds with about 120 to 140 nanoseconds being preferred.

Figure 5:
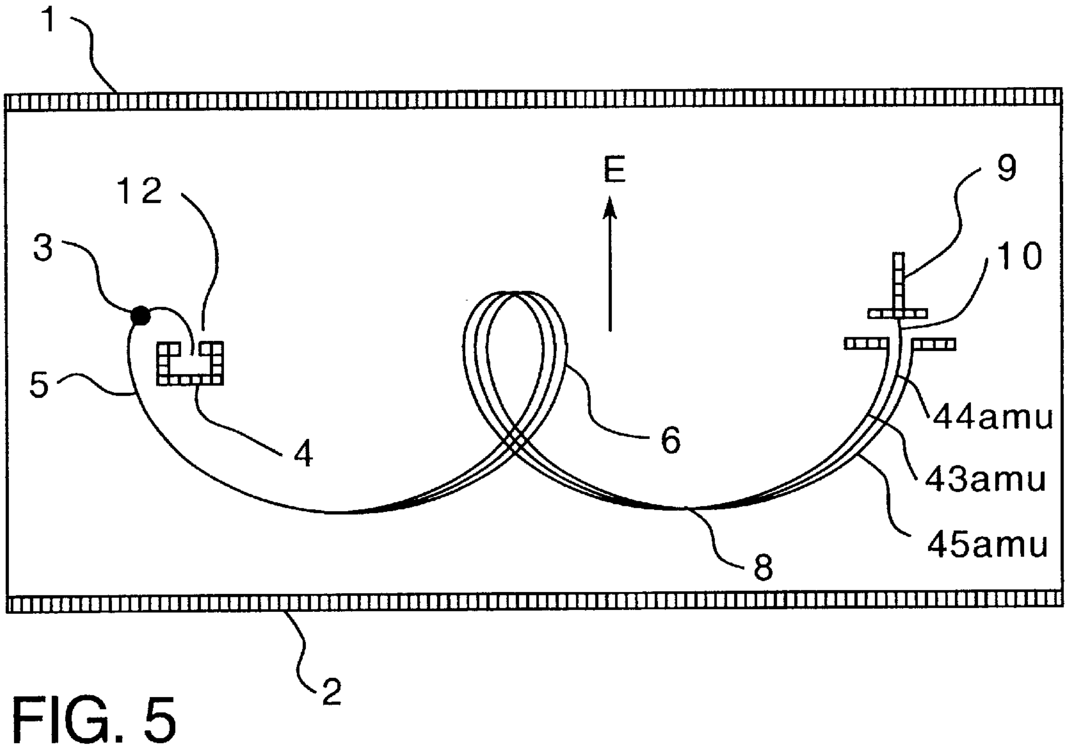
FIG. 5 is a schematic illustration of the path of movement of three ions through the system when an electric field is on during the whole flight time of the ions.

If in the analyzer a constant electric field were provided during the entire flight time, as shown in FIG. 5, the system would perform as a standard double cycloid spectrometer going through flight paths 5, 6 and 8 with the 44 amu ion impinging on detector 9 and the 43 amu and 45 amu ions not impinging upon the detector 9. As a result, for a given electrical field and magnetic field intensity, just one type of ion, such as the 44 amu, as shown in FIG. 5, will reach detector 9 through slit 10. The ions with molecular weight 43 miss to the left of slit 10 and those with 45 amu miss to the right of the slit 12. The achievable resolution is determined primarily by the size of the ionizer slit 12 through which the ions emerge and the detector slot 10 through which ions can enter and impinge on detector 9, and the focal distance from slit 12 to detector 9.

Referring again to FIG. 4, in particular the points of entry 70, 72, 74 of the respective three ions into the circular pattern 7, as well as the points of exit 54, 60 and 66, after the maximum number of revolutions for the ions separated by 1 atomic mass units (amu) to be detected will be one-half the number of the molecular weight. For example, the 44 amu ion will have 22 revolutions. For odd numbered molecular weights, the maximum number of revolutions would be one-half the mass less 0.5 to thereby create a whole integer. The points of entry 70 (m/e 43), 72 (m/e 44), and 74 (m/e 45) have point 72 (m/e 44) at the centerline C, point 70 above centerline C, and point 74 below centerline C. At the end of Phase 2, after the maximum number of revolutions, Phase 3 begins with m/e 44 at point 72 and m/e 43 at point 60(slightly below the centerline) and m/e 45 at point 66 (slightly above centerline). The m/e 43 is ½ revolution ahead of m/e 44, and m/e 45 is ½ revolution behind m/e 44. This result occurs for any position of origin of the circular flight, such as 70, 72, 74.

With continued reference to FIG. 4, each ions point of entry at Phase 2 is determined by each ions velocity entry and the time T of Phase 1. For example, with reference to FIG. 4, T is calculated for m/e 44. Its point of entry at Phase 2 will be at its focal distance exactly on the centerline. As the velocity V of m/e 43 is greater than m/e 44, during the same time T it will travel a greater distance, and be slightly ahead of m/e 44, or slightly above the centerline. As the velocity of m/e 45 is less than m/e 44, during the same time T it will travel a lesser distance than m/e 44, and be slightly behind m/e 44, or slightly below the centerline.

The radius of the circles are determined by:

$$R=(2V(m/e))^{1/2}/B \text{ in meters}$$

It can be seen, in the example of m/e 43, m/e 44, and m/e 45 with the same V applied to all, as the mass increases so does the radius.

Figure 6:
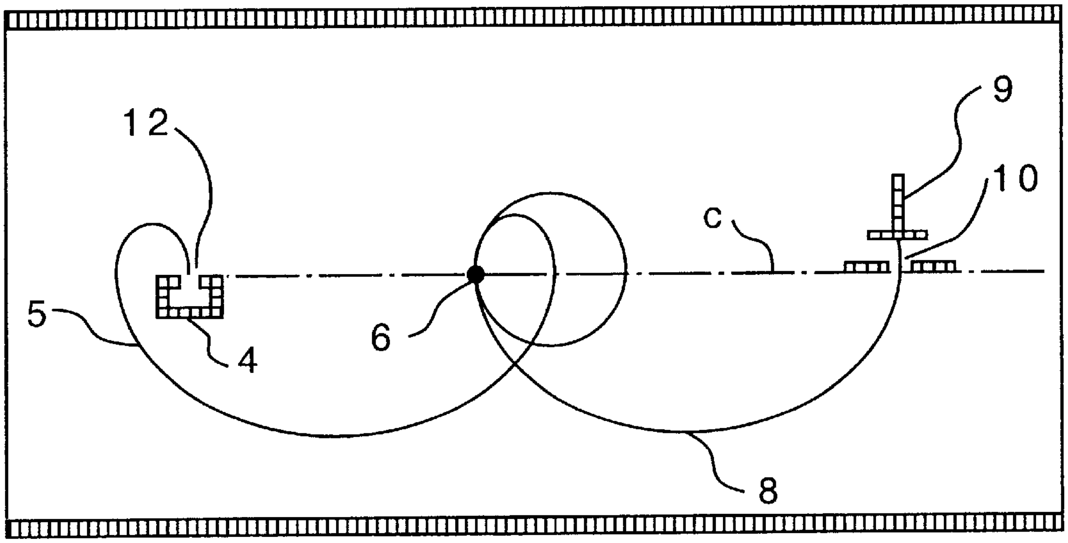
FIGS. 6 through 8 are schematic illustrations of single ions moving in an analyzer of the present invention through different flow paths and through circles of different diameters.
Figure 7:
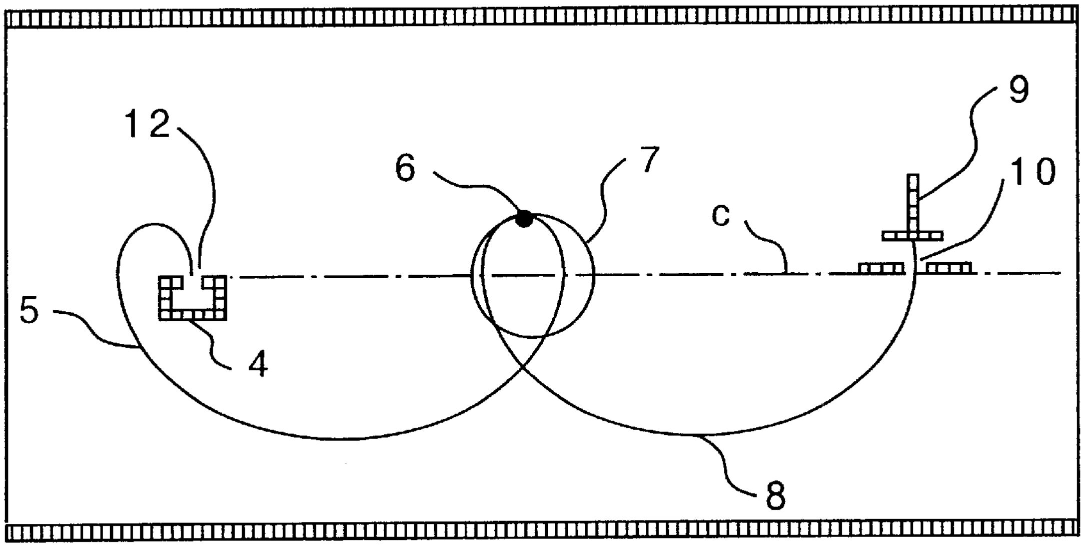
Figure 8:
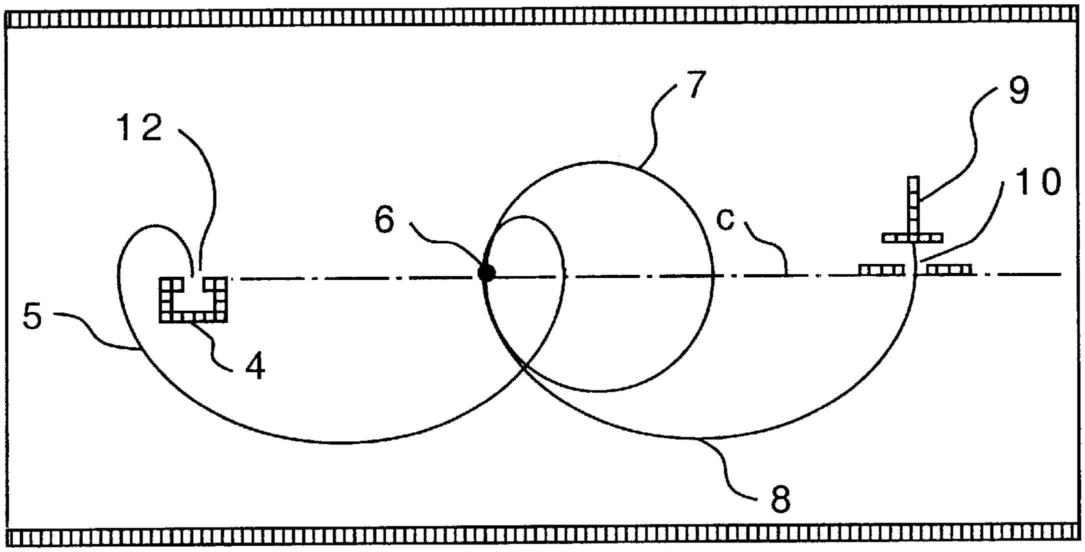

FIGS. 6, 7 and 8 illustrate different switching positions and different circular diameters.

For ions with 43 amu and 45 amu, the number of circles flown during phase 2 are 22.5 and 21.5, respectively. Because of the great deviations in the angle at the beginning of phase 3, i.e., the point on the circle where the ion emerges from circle 7 to begin path 8, the 43 amu and 45 amu ions will not impinge upon the detector. As a result of the operation and geometry of the cycloidal mass spectrometer of the present invention. The resolution of 44 amu will exceed resolution of the standard double cycloid mass spectrometer as exemplified by FIG. 5 by a factor of 22.

Figure 9:
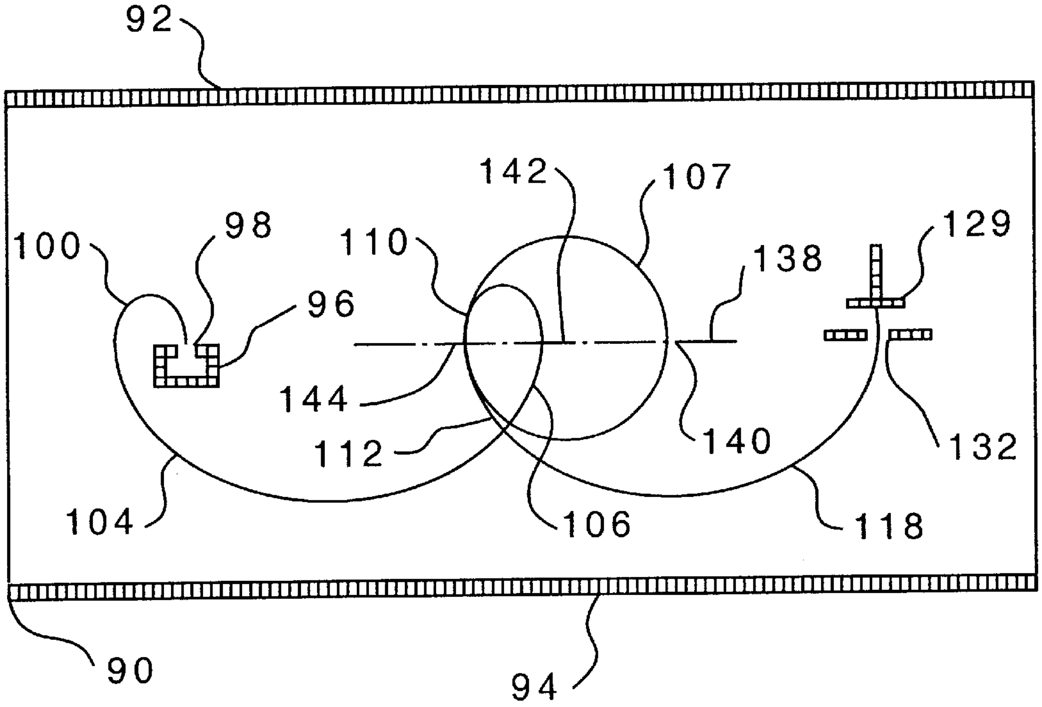
FIG. 9 is a schematic illustration of a modified form of the present invention wherein an ion filtering device is employed.

Referring to FIG. 9, there is shown a mass spectrometer 90 having an upper electrode 92 and a lower electrode 94 with an ionizer 96 having an outlet 98 and ions 100 moving in a first phase path of travel 104 to enter a circular path of travel within the phase 2 106 path entering the circle 107 at 110 and exiting the circle at point 112 to emerge in cycloidal path 118 to impinge upon detector 129 by passing through slot 132. In this embodiment, if lighter ions than the ions to be filtered perform an integer or even number of revolutions, it may be desired to enhance the filtering action through the use of a filter plate 138 which has a plurality of slits 140, 142, 144, which are so sized and positioned to provide for the desired path of flow of the ions. For example, in the 44 amu situation, the analyzer may become transparent for very light ions such as 2 amu, 4 amu or 11 amu. By providing the filter plate 138 with slits 140, 142, 144, the entry, exit and circular flight regions are better controlled and the lighter ions are kept out.

In a further preferred embodiment of the invention, the electrodes can be shaped around the area where the circular trajectory, such as 7 or 107, are expected to thereby create a slight locally restricted gradient of the electric field and thereby tend to urge the ion circles into the desired position. The changes in field structure resulting from such shaping of the electrodes are sufficiently small as to not have a meaningful impact on the ion trajectories.

It will be appreciated that the apparatus of the present invention, including the controls for initiating and terminating action of the ionizer 4, 96, the processing of information received from the detector 9, 129, the controls for turning on and off the electrical field and initiating and maintaining the magnetic field will be performed by a suitable microprocessor programmed in accordance with means well known to those skilled in the art.)

Figure 10:
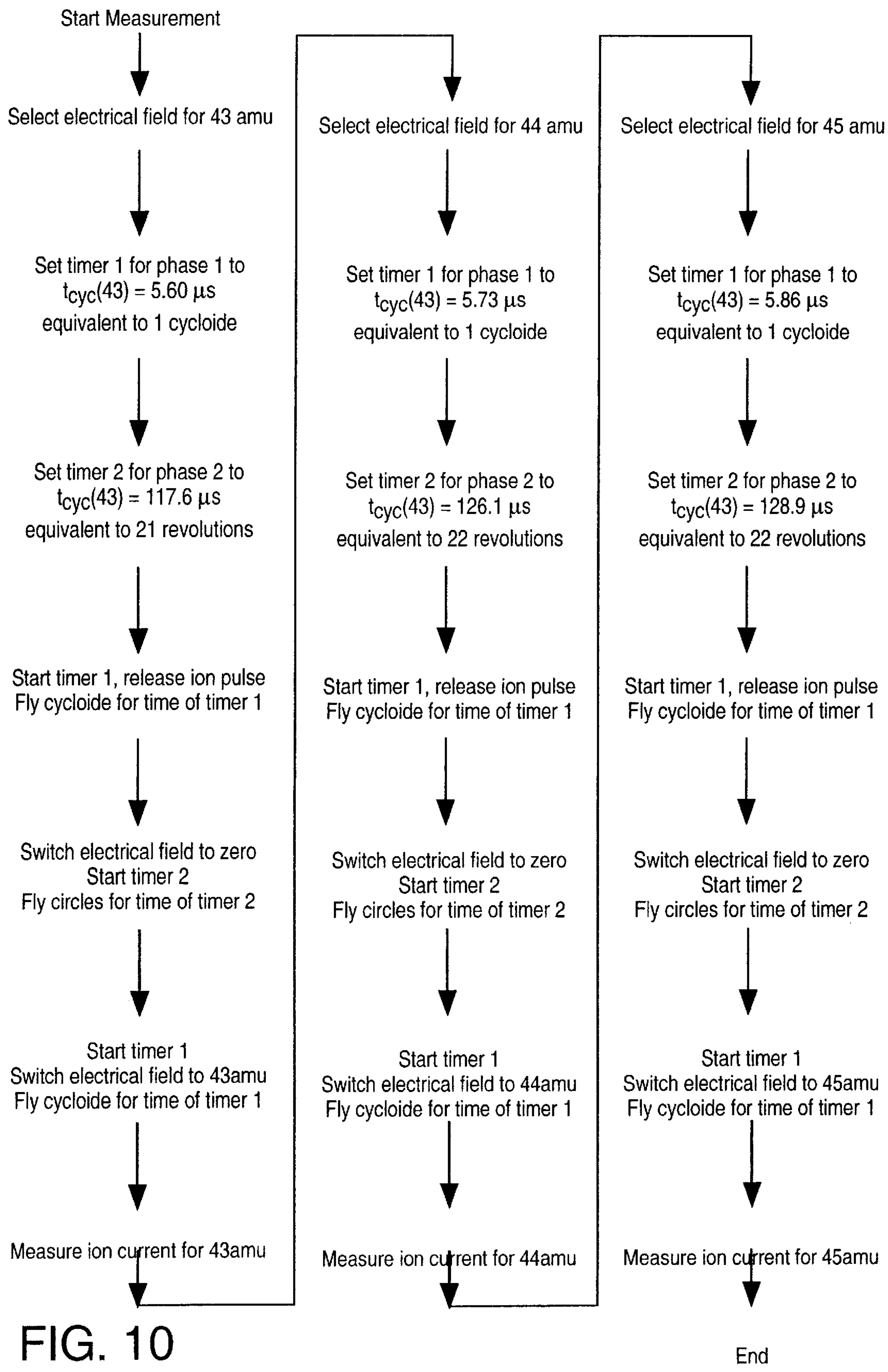
FIG. 10 is a schematic flow diagram showing an example of a cycle of operation of the present invention.

Referring to FIG. 10, a flow diagram showing an example of the cycles of operation of a preferred method of the invention will be considered.

Now considering a cycle of operation of the method, assuming that the process was likely to involve ions having 43 amu, 44 amu and 45 amu, for example, the controller would set the electrical field for each of these three ion masses.

Beginning in the first column, timer 1 would be set for phase 1 as related to 43 amu to be 5.60 microseconds, which is equivalent to 1 cycloid, and timer 2 for phase 2 would be set for 43 amu to be 117.6 microseconds. This would be the period during which the electrical field would be off. This would be equivalent to 21 revolutions for ions of 43 amu. The process would be initiated under the control of timer 1 wherein the ion pulse would be released for a time period 5.60 microseconds, after which, the electric field would be turned off for a period of 117.6 microseconds during which the 43 amu ions would move in circles. The electric field would then be switched on under the control of timer 1 with respect to 43 amu and the ions would fly in the cycloidal pattern for that time period, after which ion current impinging on the detector would be determined. Next, the electrical field would be set for 44 amu with timer 1 for phase 1 being set at 5.73 microseconds, which is equivalent to one cycloid at that mass to charge ratio and timer 2 would be set for phase 2 at 126.1 microseconds which is equivalent to 22 revolutions around the circle. Timer 1 is then started with the release of the ion pulse in a cycloidal pattern for the timer 1 period after which the electrical field is turned off and the ions of 44 amu fly in circles for the time of time period 2, after which the electrical switch is turned on for the period of timer 1 corresponding 44 amu and the ions fly in a cycloidal pattern with the current resulting from impingement of the ions on the detector being determined. Finally, the electrical field is set for 45 amu with timer 1 during phase 1 being having the electrical field on for 5.86 microseconds which is equivalent to one cycloid and timer 2 being set for phase 2 for a time of 128.9 microseconds, which is equivalent to 22 revolutions. Timer 1 is started wherein the ion pulse is released and fly in a cycloidal pattern for the period of timer 1 within the electric field, after which the electric field is turned off and timer 2 for the period for which it is set turns off the electric field with the ions flying in the circles for that period, after which timer 1 is started again and the electrical field turned on for the period corresponding to 45 amu wherein the ions fly in a cycloidal pattern for the time of timer 1 followed by measurement of the ion current for 45 amu caused by impingement on the detectors.

EXAMPLE

In order to provide a more comprehensive disclosure of certain preferred aspects of the invention, an example will be considered.

The timing of the switching on and off of the electrical field is preferably based on the scale of the cyclotron frequency. This approach, while not essential, is preferred as it simplifies the process and structures it logically. Assuming that a particle of mass m and an electrical charge e moving at a velocity of v in a homogeneous magnetic field B with "v rectangular" to B describes a circle in the time $t_{cyc}$ wherein $$t_{cyc}=2\pi e/B \quad (1)$$

$$1/t_{cyc}=f_{cyc} \quad (2)$$

is called the cyclotron frequency. For a given magnetic field B, the cyclotron frequencies for all m/e ratios are integer fractions of the maximum frequency $f_{cyc}(1)$ for 1 amu (atomic mass unit) charged by 1 elementary charge. As a result, the times required for the ion to traverse one complete circle are integer multiples of $t_{cyc}(1)$.

For example, assuming a magnetic field of 5000 Gauss, then equation (1) would result for m/e=1

$$t_{cyc}(1)=1.30257\ldots\times10^{-7}s.$$

For the single charged $CO_2$ ion of 44 amu, this results in $$t_{cyc}(44)=44\times t_{cyc}(1)=5.7319\ldots\times10^{-6}s,$$

and for the "neighboring isotope" ion $C^{12}C^{13}O_2$ with 45 amu $$t_{cyc}(45)=45\times t_{cyc}(1)=5.86158\ldots\times10^{-6}s,$$

which differs by $t_{cyc}(1)$ from the 44 result. This difference is a constant for all pairs of ions differing by 1 in their mass to charge ratio.

The integer number of revolutions gives the maximum separation of the neighboring masses from a given mass, which is half the mass to charge ratio. If this number is odd, then the next integer would be employed. For example, in the case of 44 amu, the number is 22 and the difference is in flight time per circle summarize for 45 amu and 43 amu to $22\times t_{cyc}(1)$ which corresponds to half the circle flown by the ion of 44 amu.

In the event that maximum separation is not required, any integer smaller than the maximum number of revolutions can be selected to accelerate the process.

It will be appreciated that the present invention provides an improved means of effecting high resolution through a cycloidal mass spectrometer wherein time of flight concepts are employed, but within a dimensionally small analyzer as a result of a period during which the electrical field is turned off while maintaining the magnetic field thereby causing the ions to travel in a circular path, after which restoration of the electrical field results in the ions resuming a cycloidal path and depending upon the mass to charge ratios resulting in a filtering action which determines whether a given ion impinges on the detectors. Also, in a preferred embodiment, a slotted filter is provided upstream of the region of circular travel to filter out lower molecular weight ions.

Whereas particular embodiments of the invention have been described herein for purposes of illustration, it will be evident to those skilled in the art that numerous variations of the details may be made without departing from the invention as set forth in the appended claims.

What is claimed is:

1. A method of separating ions according to mass in a mass spectrometer comprising establishing a stream of ions traveling in a generally cycloidal path in an electrical field and a magnetic field, causing said ions to travel in a generally circular path within said magnetic field by terminating said electrical field for a predetermined period of time, reestablishing said electrical field to cause said ions to travel within a second cycloidal path, and providing a detector for receiving certain ions.

2. The method of claim 1 including effecting said termination of said electrical field for a period of about 100 to 150 nanoseconds.

3. The method of claim 1 including establishing said ion stream by a cycloidal mass spectrometer ionizer.

4. The method of claim 1 including emitting electrical signals from said detector responsive to receipt of ions thereon, and a microprocessor receiving said signals and effecting a determination of the mass of said ions therefrom.

5. The method of claim 1 including effecting said circular travel of said ions for a predetermined number of revolutions.

6. The method of claim 5 including effecting said circular travel for a number of revolutions generally equal to one-half the molecular weight of said ions.

7. The method of claim 1 including employing said process with ions of a plurality of molecular weights simultaneously.

8. The method of claim 7 including effecting departures from said circular ion path of travel at different points for ions of different mass.

9. The method of claim 1 including filtering said ions entering and exiting the region where the ions travel in said generally circular path.

10. The method of claim 1 including employing modifications in the electrical field adjacent to the ions traveling in the generally circular path to resist undesired movement of said circles.

11. A mass spectrometer including a cycloidal ionizer for converting a specimen into a plurality of ion beams which travel in a generally cycloidal path in a magnetic field and an electrical field, and a microprocessor for terminating said cycloidal travel and converting the ion travel to generally circular travel by terminating the electric field for a predetermined period of time and reinitiating the electric field to cause said ions to travel in a second generally cycloidal path.

12. The mass spectrometer of claim 11 including a detector for receipt of certain ions traveling in said second cycloidal path.

13. The mass spectrometer of claim 11 including said microprocessor being programmed to establish said termination of said electrical field for a period of about 100 to 150 nanoseconds.

14. The mass spectrometer of claim 13 including said detector responsive to impingement on the detector means of ions being structured to deliver electrical signals to said microprocessor.

15. The mass spectrometer of claim 11 including the microprocessor being programmed to provide for a predetermined number of revolutions of said ions when said electrical field is not on.

16. The mass spectrometer of claim 15 including said microprocessor being programmed to effect said circular travel of said ions for a number of revolutions generally equal to one-half the molecular weight of the ions.

17. The mass spectrometer of claim 16 including a slotted filter for limiting entry of ions into the circular path of travel and exiting of the same.

* * * * *